United States Patent
Wu et al.

(10) Patent No.: US 10,489,138 B1
(45) Date of Patent: Nov. 26, 2019

(54) MANAGING SOFTWARE UPGRADES IN STORAGE SYSTEMS

(71) Applicant: EMC Corporation, Hopkinton, MA (US)

(72) Inventors: Jun Wu, Shanghai (CN); Yourong Wang, Shanghai (CN); Haitao Kenny Zhou, Shanghai (CN); Kenneth Wood, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 15/198,046

(22) Filed: Jun. 30, 2016

(51) Int. Cl.
   *G06F 8/65* (2018.01)
   *H04L 12/24* (2006.01)
   *H04L 12/26* (2006.01)
   *H04L 29/08* (2006.01)

(52) U.S. Cl.
   CPC .......... *G06F 8/65* (2013.01); *H04L 41/08* (2013.01); *H04L 41/14* (2013.01); *H04L 41/20* (2013.01); *H04L 43/06* (2013.01); *H04L 67/1097* (2013.01); *H04L 67/34* (2013.01)

(58) Field of Classification Search
   CPC . G06F 8/65; H04L 41/08; H04L 41/14; H04L 41/20; H04L 43/06; H04L 67/1097; H04L 67/34
   See application file for complete search history.

(56) References Cited

U.S. PATENT DOCUMENTS

| | | | | |
|---|---|---|---|---|
| 2008/0005733 A1* | 1/2008 | Ramachandran | ......... | G06F 8/65 717/168 |
| 2009/0210866 A1* | 8/2009 | Troan | ......... | G06F 8/65 717/168 |
| 2012/0331454 A1* | 12/2012 | Cross | ......... | G06F 8/658 717/170 |
| 2014/0201727 A1* | 7/2014 | Asselin | ......... | G06F 8/654 717/170 |
| 2014/0208304 A1* | 7/2014 | Subramanya | ......... | G06F 8/65 717/170 |
| 2015/0142728 A1* | 5/2015 | Nigam | ......... | G06F 17/30289 707/609 |

* cited by examiner

*Primary Examiner* — Gil H. Lee
(74) *Attorney, Agent, or Firm* — Krishnendu Gupta; Deepika Bhayana

(57) ABSTRACT

A method is used in managing software upgrades in storage systems. An upgrade path information is received describing conditions relevant to upgrading a software from a set of source software revisions to a set of target software revisions. A set of rules denotes storage system configuration conditions relevant to upgrading the software from a source software revision to a target software revision. Storage system configuration information from a set of storage systems of a set of customers is gathered. Storage system configuration of a storage system is analyzed for a software upgrade of the storage system in accordance with a set of rules associated with the software upgrade.

18 Claims, 5 Drawing Sheets

|   | 1 | 2 | 3 | 4 | 5 |
|---|---|---|---|---|---|
| 5 | Y | Y | Y | Y | NA |
| 4 | Y | N | N | NA | NA |
| 3 | Y | Y | NA | NA | NA |
| 2 | Y | NA | NA | NA | NA |
| 1 | NA | NA | NA | NA | NA |

VERSION TO (rows) / VERSION FROM (columns); matrix labeled 200.

FIG. 3
(PRIOR ART)

| VERSION TO | | | | | |
|---|---|---|---|---|---|
| 5 | RULE 1: Y<br>RULE 2: Y<br>RULE 3: Y | RULE 1: Y<br>RULE 2: Y<br>RULE 3: Y | RULE 1: Y<br>RULE 2: Y<br>RULE 3: Y | RULE 1: Y<br>RULE 2: Y<br>RULE 3: Y | NA |
| 4 | RULE 1: Y<br>RULE 2: Y<br>RULE 3: Y | RULE 1: Y<br>RULE 2: N<br>RULE 3: N | RULE 1: N<br>RULE 2: N<br>RULE 3: Y | NA | NA |
| 3 | RULE 1: Y<br>RULE 2: Y<br>RULE 3: Y | RULE 1: Y<br>RULE 2: Y<br>RULE 3: Y | NA | NA | NA |
| 2 | RULE 1: Y<br>RULE 2: Y<br>RULE 3: Y | NA | NA | NA | NA |
| 1 | NA | NA | NA | NA | NA |
| | 1 | 2 | 3 | 4 | 5 |

210

VERSION FROM

FIG. 4

MANAGING SOFTWARE UPGRADES IN STORAGE SYSTEMS

BACKGROUND

Technical Field

This application relates to managing software upgrades in storage systems.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

It will be appreciated from the foregoing that techniques for managing software upgrades in storage systems can be complex. It is, therefore, desirable to provide less complex techniques for efficiently managing software upgrades in storage systems.

SUMMARY OF THE INVENTION

A method is used in managing software upgrades in storage systems. An upgrade path information is received describing conditions relevant to upgrading a software from a set of source software revisions to a set of target software revisions. A set of rules denotes storage system configuration conditions relevant to upgrading the software from a source software revision to a target software revision. Storage system configuration information from a set of storage systems of a set of customers is gathered. Storage system configuration of a storage system is analyzed for a software upgrade of the storage system in accordance with a set of rules associated with the software upgrade.

BRIEF DESCRIPTION OF THE DRAWINGS

Features and advantages of the present technique will become more apparent from the following detailed description of exemplary embodiments thereof taken in conjunction with the accompanying drawings in which:

FIG. 3 is a diagram illustrating in more detail components that may be used in connection with conventional techniques;

FIG. 4 is a diagram illustrating in more detail components that may be used in connection with techniques herein.

DETAILED DESCRIPTION OF EMBODIMENT(S)

Figure 1:
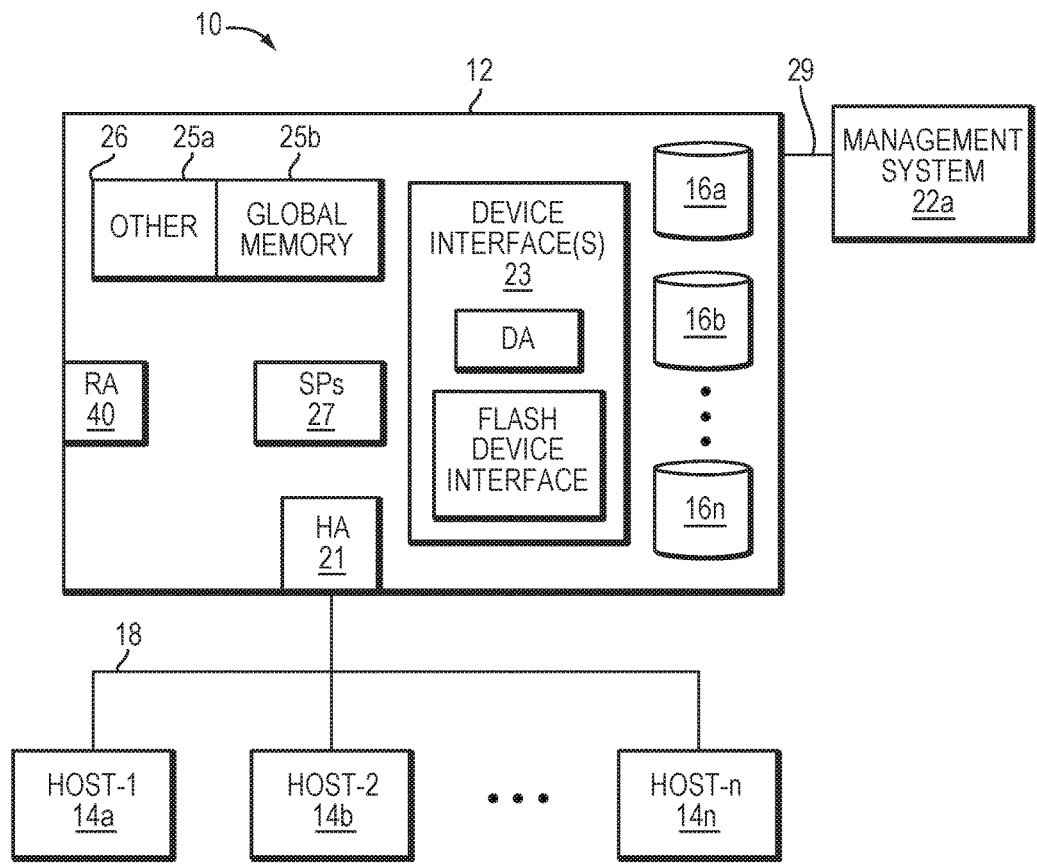
FIG. 1 is an example of an embodiment of a computer system that may utilize the techniques described herein.

Described below is a technique for use in managing software upgrades in storage systems, which technique may be used to provide, among other things, receiving an upgrade path information describing conditions relevant to upgrading a software from a set of source software revisions to a set of target software revisions, where a set of rules denotes storage system configuration conditions relevant to upgrading the software from a source software revision to a target software revision, gathering storage system configuration information from a set of storage systems of a set of customers, and analyzing storage system configuration of a storage system for a software upgrade of the storage system in accordance with a set of rules associated with the software upgrade.

Generally, as a part of managing storage devices of a storage system and managing servicing of the storage system may require an upgrade of storage software of the storage system to a new version of the storage software. However, a goal is to perform an upgrade of storage software of a storage system without causing any disruption to users of the storage system. Conventionally, when storage software of a storage system is upgraded to a new version of the storage software, continued access to the storage system is impacted because of complexity of the upgrade procedure and storage software. In such a conventional system, performance of a storage system degrades during an upgrade of storage software of the storage system. Further, in such a conventional system, data of a storage system may become unavailable or lost ("Data Unavailable (DU)/Data Loss (DL)" situation) when storage software of the storage system is upgraded. Generally, a set of conditions ("pre-checks") are evaluated prior to upgrading storage software of a storage system either manually by a system administrator or automatically by the storage software in order to determine whether storage device conditions of the storage system satisfies a set of requirements for upgrading the storage software. However, in a conventional system, there does not exists a mechanism to have knowledge of detailed upgrade requirements for upgrading storage software to newer versions of the storage software because it is difficult or impossible to have knowledge of such upgrade requirements at the time the current version of storage software is designed and developed. In such a conventional system, a set of upgrade rules can only be identified after new versions of storage software are developed and based on failures and/or issues that occurs during an upgrade of the storage software. Thus, in such a conventional system, a storage system is unable to evaluate a set of rules for upgrading storage software without having knowledge of what conditions and/or rules need to be evaluated for each upgrade path for the storage software. Further, in such a conventional system, when a storage administrator or a user or a storage service makes a decision to upgrade storage software of a storage system, an upgrade path document is evaluated to determine upgrade information such as which software versions are approved for an upgrade, and impact and/or risk for the storage system associated with such upgrade. Alternatively, in such a conventional system, a tool may be used to conduct pre-checking of a set of conditions prior to upgrading storage software of a storage system. However, in such a conventional system, there does not exist any mechanism to provide up-to-date information regarding a set of conditions required for performing an upgrade of storage software to newer versions of the storage software. Thus, in such a conventional system, it is difficult or impossible to conduct an upgrade and avoid or have least impact on the storage system at the same time. In such a conventional system, an upgrade of storage software to a specific version of the storage software is either supported or not supported. In such a conventional system, there does not exist a mechanism to perform corrective actions automatically for upgrading storage software to a different version of the storage software where such upgrade is not supported. Thus, in such a conventional system, it is difficult or impossible for a customer to resolve any issues that may be encountered during an upgrade which may cause such upgrade to fail.

By contrast, in at least some implementations in accordance with the technique as described herein, by creating a flexible upgrade path structure that provides an up-to-date information, recommendations, guidance, and/or instructions after pre-checking a set of upgrade requirements enables a storage system to perform corrective actions automatically prior to upgrading storage software.

In at least one embodiment of the current technique, a storage system provider (e.g., storage system provider's engineering and/or development group) creates an upgrade path document which is saved in an upgrade path database by converting information of the upgrade path document into information organized in a structured data format. In at least one embodiment of the current technique, such information stored in an upgrade path database may include a set of rule. For example, one rule may indicate whether deduplication has been enabled on a storage system and a corrective action associated with such rule may indicate disabling deduplication on the storage system. Further, in such an example embodiment, another rule may indicate whether a data evacuation feature has been enabled on a storage system and a corrective action associated with such rule may indicate disabling the data evacuation feature on the storage system. In at least one embodiment of the current technique, prior to an upgrade of storage software to a different version of the storage software, customer configuration of a set of storage systems is gathered into a customer configuration database from such storage systems by a background process periodically. In at least one embodiment of the current technique, an upgrade pre-check engine analyzes customer system configuration data from a storage system of a customer for upgrading storage software of the storage system from a previous version to a new version of the storage software and evaluates a set of rules associated with such upgrade. Further, the result of such analysis includes recommended upgrade path information which may further include corrective actions, if required, for upgrading such storage software from the previous version of the storage software to the new version of the storage software where such analysis may be provided by using web services. In at least one embodiment of the current technique, when a customer makes a decision to upgrade storage software of a storage system, a pre-check is triggered which analyzes customer system configuration data and sends the result of such analysis by using upgrade pre-check web services for sending upgrade recommendations to the customer. Thus, in at least one embodiment of the current technique, a customer is able to upgrade storage software from a previous version of the storage software to a new version of the storage software by automatically performing corrective actions, if required, based on upgrade path recommendations received from upgrade pre-check logic (also referred to herein as "upgrade pre-check engine").

In at least some implementations in accordance with the current technique as described herein, the use of the managing software upgrades in storage systems technique can provide one or more of the following advantages: improving efficiency of an upgrade process of a storage system by efficiently upgrading storage software of the storage system, improving performance of an upgrade process of a storage system by automatically performing corrective actions for upgrading storage software from one version to another version of the storage software, and reducing the amount of time it takes to upgrade storage software by efficiently evaluating a set of rules during an upgrade pre-check process.

It should be noted that the terms "data storage system", "storage system", disk array", and "storage array" have been used interchangeably in this specification.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi-level cell) devices.

The data storage array may also include different types of adapters or directors, such as an HA 21 (host adapter). RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces. HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor. The storage processors 27 may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the SPs. Upon the occurrence of failure of one the SPs, the other remaining SP may handle all processing typically performed by both SPs.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs. and so on.

In a data storage system, it is highly undesirable to have data stored thereon by unavailable/unreachable (DU) or otherwise experience a data loss (DL). Occurrences of DU/DL may be caused by bugs, errors or problems in data storage system software, and may occur under some specific system conditions. Once a storage provider becomes aware of such bugs, errors, or other problems in data storage system software such as in a first customer's system, a storage provider of the system software may provide the particular first customer with a correction or a solution, such as a patch or "hotfix", an upgraded version of the storage system software. Many DU/DL occurrences on other customer systems having a same or similar configuration to that of the first customer may be avoided if such other customers also apply the same patch or upgrade as the first customer prior to having such other customers experience conditions causing a DU/DL. However, some customers may not be willing to apply all upgrades and corrections to system software if the customers are not aware of the value of performing such upgrades and corrections.

Described in following paragraphs are techniques that may be used in connection with performing upgrades of storage software which may include automatically performing corrective actions on storage systems of storage customers with respect to upgrades, software patches, and the like, performed on the storage systems that may be beneficial for the customer based on the particular data storage system configuration of the customer's storage system. In at least one embodiment, a process, tool, and/or web service may be used in connection with providing information such as recommendations and/or reminder to storage system customers or storage services that want to upgrade storage software regarding an upgrade path and/or performing corrective actions, if required, in a proactive manner in order to avoid experiencing any potential upgrade risks such as DU/DL occurrence and successfully perform storage software upgrade. Through proactive analysis of customer storage configuration data and upgrade path information such as by an upgrade pre-check engine, a storage provider can notify those customers with potential corrective actions to perform regarding storage software upgrade requested by a customer. Thus, techniques herein provide for managing storage software upgrade while recommending an upgrade path to a customer regarding a software upgrade and automatically performing corrective actions, if required, as indicated by the upgrade path.

Generally, a data storage system configuration of a customer may be described in a configuration file. The configuration file may denote aspects of the data storage configuration such as, for example, the configuration of storage pools (e.g., type of physical storage devices such as flash drives, particular rotating disk drives, RAID group or level, number of physical storage devices), data protection and other data services performed (e.g., snapshot facility, remote data protection facility, file system, data storage optimizer, data deduplication services), current usage or consumption of different storage pools. RAID groups, logical devices or groups of logical devices, particular versions of software and hardware components installed and running in the data storage system, and the like.

Figure 2:
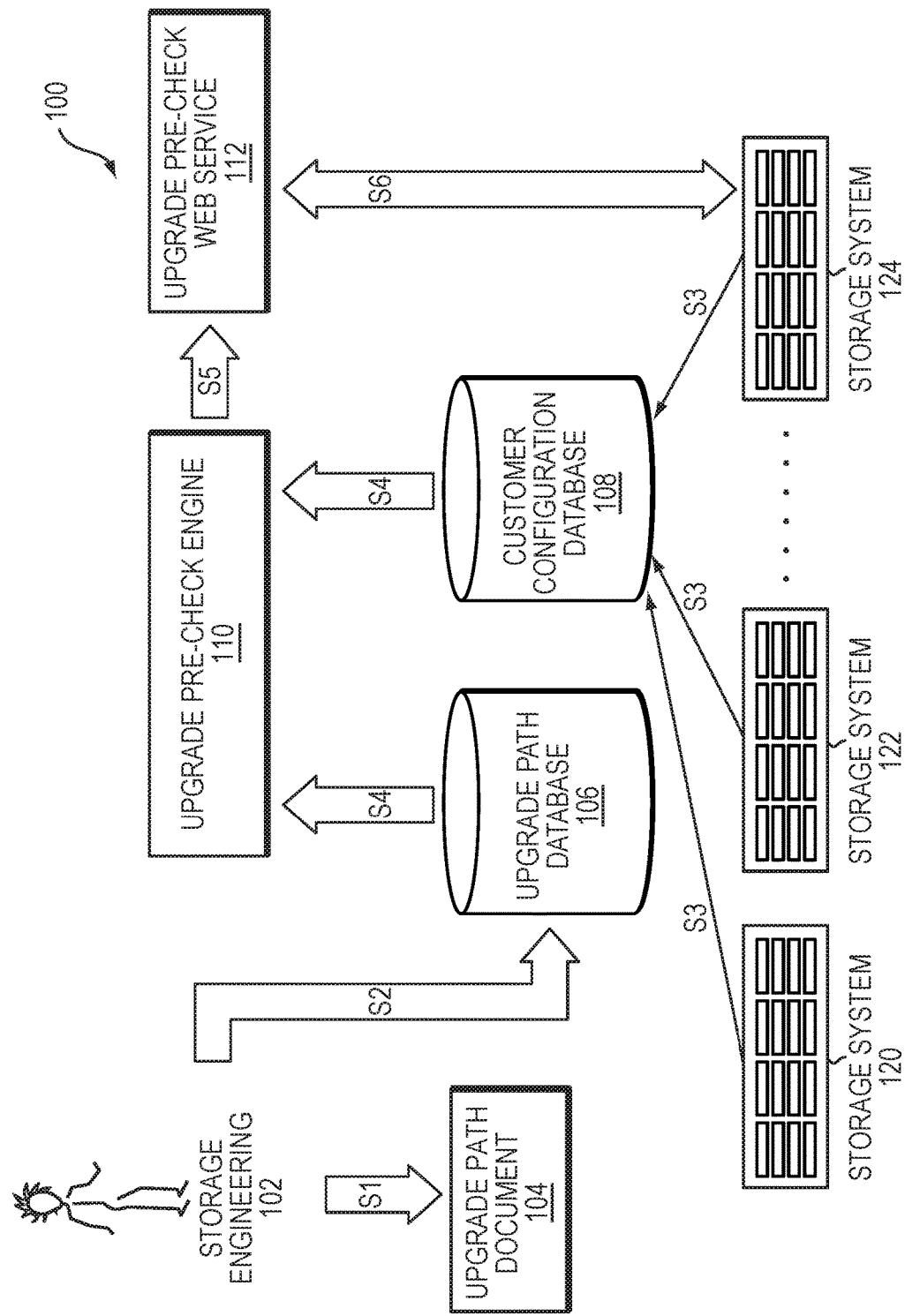
FIG. 2 is a diagram illustrating in more detail components that may be used in connection with techniques herein.

Referring to FIG. 2, shown is an example architecture 100 illustrating components and data flow in an embodiment in accordance with techniques herein. At various points in time, a new version of storage software for data storage system software may be available for installation and use on customer data storage systems. A newer version of storage software may generally be provided as a solution to one or more bugs or problems with a particular version of software. Further, a newer version of storage software may generally include a set of new features developed by a storage provider. At a first step S1, storage engineering 102 of a storage provider may generate an upgrade path document which describes a set of conditions required for upgrading storage software from one specific version to another version of the storage software. In a step S2, the upgrade path document 104 may be placed in the upgrade path database 106 by converting information of the upgrade path document into a structured data format suitable for storing in the upgrade path database 106. The customer configuration database 108 may include data storage system configuration information for each supported customer's data storage system. In a step S3, storage system configurations of various storage systems 120, 122, 124 from customers is gathered into customer configuration database 108. Such storage system configurations may be gathered periodically at a specific time interval by a background process which may execute independently of any other steps illustrated in FIG. 2. Further, storage systems may reside at one customer data center, or a plurality of different customers' respective data centers. In a step S4, the upgrade pre-check engine 110 may read from the databases 106 and 108 whereby the engine 110 analyzes storage system configurations of customers from 108 in accordance with a set of rules indicated by the upgrade path documents of 106 to determine how to upgrade storage software version on a storage system of a customer from one version to another version of the storage software based on current storage system configuration information of such targeted customer (as included in database 108).

In particular, the engine 110 may perform rule matching between rules of the different upgrade paths indicated by upgrade path data base 106 and the different data storage system configurations of 108. If there is a match between information in a particular data storage system configuration of a storage system and one or more rules of a storage software upgrade for such storage system, in step S5 the engine 110 generates a recommended upgrade path report customized for a particular customer which may be provided to such customer via upgrade pre-check web service 112. The report provided via upgrade pre-check web service 112 may identify an upgrade path along with additional information explaining details of how to successfully perform the upgrade. In a step S6, the detailed upgrade report may be sent to a customer.

In at least one embodiment of the current technique herein, any one or more of the upgrade pre-check engine 110, upgrade path database 106 and customer configuration database 108 may be located at a node, or more generally a point of network connectivity, on the internet or other network connected to the various customer data storage systems. For example, the customer configuration database 108 may be located at a node or more generally a point of network connectivity on the internet. In this manner, customer configuration files may be uploaded from customer data storage systems to the customer configuration database. Such uploads for each customer data storage system may be performed at various different points in time in an ongoing manner. For example, changes to customer configuration file may be uploaded periodically at regular defined time intervals, responsive to any change in data storage configuration, and the like.

More generally, a rule included in the upgrade path database 106 may denote conditions of when a particular software upgrade from one version to another may be possible and based on what specific customer storage system configurations. For example, the rule may include criteria identifying conditions, such as particular configuration settings, options or conditions, which are required to perform a particular software upgrade.

In this manner, techniques described herein may be used to provide customers information regarding recommended upgrade path and corrective actions in a proactive manner, such as prior to the customer experiencing a DU/DL occurrence during software upgrade. By conducting upgrade pre-check analysis of data storage configuration information for customers against a set of rules indicated by upgrade path database 106, a data storage system provider can identify which corrective actions to perform in order to conduct an upgrade and make an accurate recommendation to the customers regarding the upgrade. Thus, techniques herein proactively provide upgrade path information and recommended corrective actions to a customer with detailed information based on configuration analysis to facilitate the customers avoiding system issues during the upgrade such as DU/DL issues based on configuration analysis. In such embodiments as described herein, each customer may have the final decision to upgrade or not according to their business situation. If a customer makes a decision to upgrade storage software, recommended corrective actions may be performed automatically by a storage system.

Referring to FIG. 3, shown is more detailed representation of components that may be included in a conventional embodiment using conventional techniques. Element 200 illustrates a structure for an upgrade path used in a conventional system. Generally, an upgrade path describes information regarding an upgrade activity for storage software from one version of the storage software to another version of the storage software. For example, as illustrated in Element 200, in a conventional system, an upgrade of software from version 2 to version 1 is not supported and is invalid, an upgrade of software from version 2 to version 3 is supported, and an upgrade of software from version 3 to version 4 is not supported as there does not exist any mechanism to avoid any potential system risks and/or issues that may be encountered during such specific upgrade. Thus, in such a conventional system, an upgrade path is illustrated in a two-dimensional hierarchy where an upgrade is either supported or considered invalid.

Referring to FIG. 4, shown is more detailed representation of components that may be included in an embodiment using the techniques herein. With reference also to FIGS. 1-2, element 210 illustrates a structured upgrade path which illustrates an upgrade path in a three-dimensional hierarchy in contrast with a two-dimensional structure (also referred to herein as "hierarchy") used by conventional techniques. In at least one embodiment of the current technique, unlike conventional systems, an indication of "yes" or "no" is not predefined with respect to whether a specific upgrade path may be supported. Further, a set of rules indicates a recommended upgrade path for an upgrade. For example, as illustrated in element 210, an upgrade of software from version 2 to version 1 is not supported and is invalid, an upgrade of software from version 2 to version 3 is supported, and an upgrade of software from version 3 to version 4 is conditionally supported based on a set of conditions indicated by a set of rules. In such a case, if a customer performs corrective actions as recommended by a set of rules for a conditional upgrade, the upgrade may be performed.

Further, element 210 illustrated in FIG. 4 is an example illustrating information of upgrade path document 104 as may be stored in the upgrade path database 106 for each software upgrade from one version to another. As illustrated by element 210, an upgrade path document may include the following information:

For example, rules of the upgrade path document 104 may include the following 2 rules:

Rule 1: Whether deduplication has been enabled on a storage system; Corrective Action/Fix/Recommendation: If deduplication has been enabled, disable deduplication configuration option.

Rule 2: Whether data Evacuation has been enabled on a storage system; Corrective Action/Fix/Recommendation: If data evacuation has been enabled, disable data evacuation configuration option.

Thus, each rule in the upgrade path database 106 is described by a key and value pair such that the key denotes a condition of customer storage system configuration and the value denotes whether such condition should be enabled ("yes") or disabled ("no").

Thus, information in the element 210 identifies a set of one or more rules denoting conditions in connection with a configuration of the data storage system which may indicate whether storage software can be upgraded from one specific version of the storage software to another specific version of the storage software. Additionally, the foregoing conditions of the rule identify conditions related to the correction or fix of a specific upgrade path. Further, a set of rules may denote rule criteria that are evaluated to see if it matches information in a particular customer's data storage configuration information as stored in the database 108. Thus, evaluation of a rule to true whereby the rule matches existing conditions in a current data storage system configuration of a data storage system means that the data storage system is at risk of encountering an issue during an upgrade (such as a DU/DL occurrence) and should apply the recommended fix prior to upgrading storage software.

Figure 5:
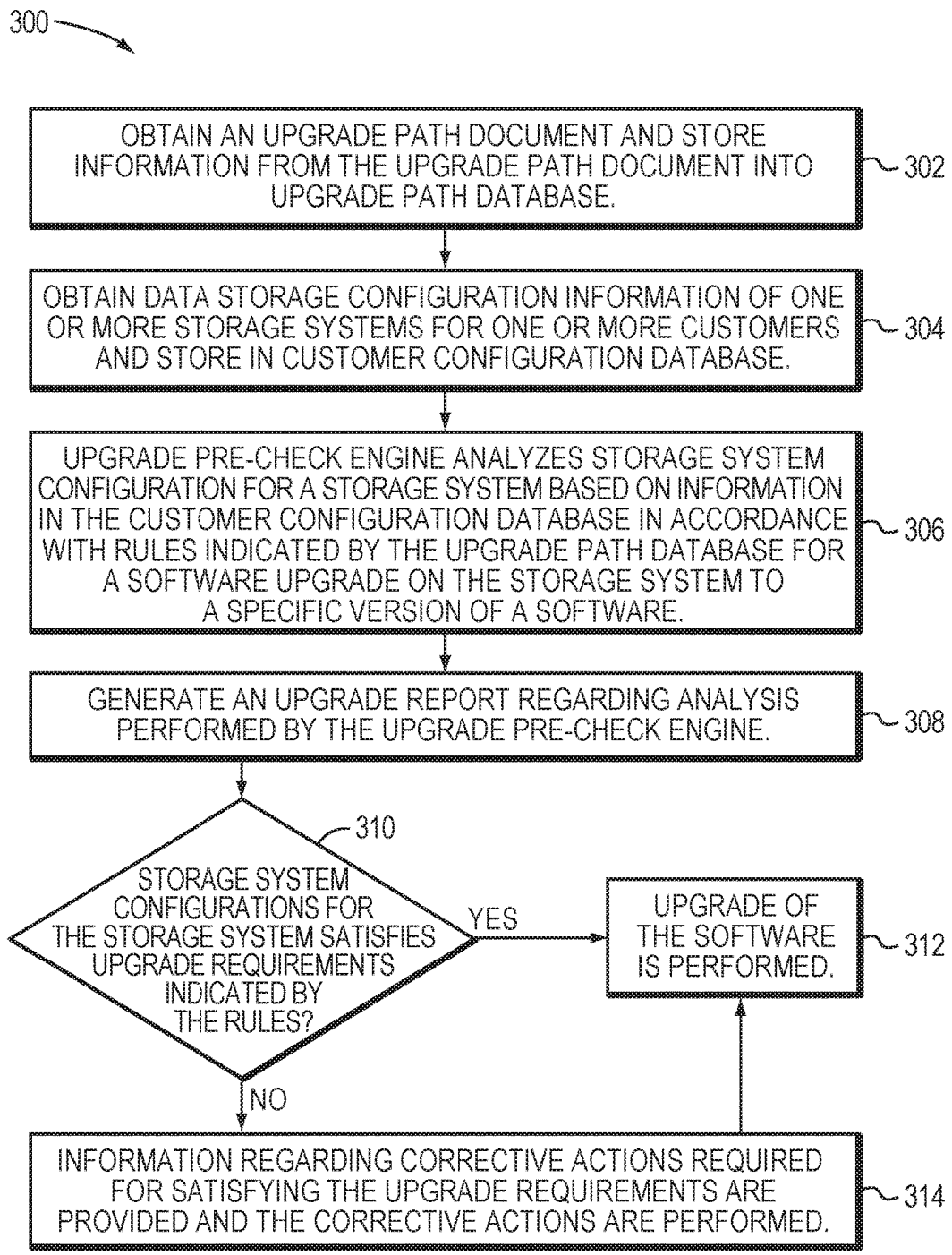
FIG. 5 is a flow diagram illustrating processes that may be used in connection with techniques herein.

Referring to FIG. 5, shown is a more detailed flow diagram illustrating managing software upgrades in storage systems. With reference also to FIGS. 1-2 and 4, in at least one embodiment of the current technique, storage provider creates an upgrade path document 104 for storage software indicating a set of rules for each specific upgrade path as illustrated in FIG. 4. Information included in the upgrade path document is converted into structured data and stored in an upgrade path database 106 (Step 302). Prior to upgrading storage software of a customer's storage system, storage configuration information for the customer's storage system is periodically gathered by a background process in a customer configuration database 108 (Step 304). An upgrade pre-check engine 110 analyzes customer configuration data for a storage system based on information stored in the customer configuration database 108 in accordance with a set of rules indicated by the upgrade path database 106 for a specific software upgrade on the storage system (Step 306). Based on the analysis, upgrade pre-check engine 110 generates a recommended upgrade path which may be provided to a customer via a web service 112 (Step 308). A determination is made regarding whether customer configuration data for a storage system satisfies upgrade requirements indicated by a set of rules indicated by an upgrade path database 106 (Step 310). Upon determining that the customer configuration data for the storage system satisfies the upgrade requirements, the storage software is upgraded to a new version (Step 312). However, upon determining that the customer configuration data for the storage system does not satisfies the upgrade requirements, information regarding a set of rules that failed to meet the upgrade requirements and corresponding corrective actions required for performing the upgrade are provided to a customer and corrective actions are performed prior to performing the upgrade (Step 314). Thus, in at least one embodiment of the current technique, when a customer or storage user of a storage system wishes to conduct an upgrade of storage software from one version of the storage software to another version of the storage software, an upgrade pre-check process is invoked and performed such that results of analysis performed by the upgrade pre-check process provides recommendations regarding the upgrade to the customer or storage user via a web service such that if customer configuration of the storage system does not meet a set of upgrade requirements indicated by an upgrade path database, a set of failed rules along with a set of corrective actions for performing the upgrade are provided to the customer or storage user.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a". "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing software upgrades in storage systems, the method comprising:
    receiving an upgrade path information describing conditions relevant to upgrading a software from a set of source software revisions to a set of target software revisions, wherein a set of rules denotes storage system configuration conditions relevant to upgrading the software from a source software revision to a target software revision, and wherein the upgrade path information has a three-dimensional hierarchy such that each rule of the set of rules is described by a key-value pair, wherein the key denotes a condition of one or more of the storage systems and the value denotes whether the condition should be enabled or disabled;
    periodically gathering storage system configuration information from a set of storage systems of a set of customers;
    analyzing storage system configuration of a storage system for a software upgrade of the storage system in accordance with a set of rules associated with the software upgrade for determining whether the software upgrade can be performed for the storage system;
    based on the analysis, providing upgrade recommendations to a user of the storage system, wherein the upgrade recommendations include a set of corrective actions upon determining that the storage system configuration of the storage system are not in accordance with the set of rules associated with the software upgrade; and
    performing the software upgrade for the storage system based on the update recommendations.

2. The method of claim 1, further comprising:
    performing the set of corrective actions.

3. The method of claim 1, further comprising:
    upgrading the software of the storage system based on performing of the set of corrective actions.

4. The method of claim 1, further comprising:
    generating a report in accordance with said analyzing; and
    sending the report to a customer of the storage system.

5. The method of claim 1, wherein each rule of the set of rules is associated with a set of corrective actions.

6. The method of claim 1, wherein the upgrade path information is organized in a structured format in an upgrade path database for a set of upgrade paths, each upgrade path associated with a set of rules including one or more rule criteria denoting storage system configuration conditions relevant to performing an upgrade of software for respective upgrade path.

7. The method of claim 1, wherein each rule of the set of rules identify any of a storage system configuration option, storage system configuration setting, a storage system service, or a current state of a storage system.

8. The method of claim 1, wherein the storage system configuration information is gathered repeatedly from the set of storage systems of the set of customers by a background process.

9. The method of claim 1, further comprising:
    receiving a request to upgrade the software of a storage system from the source software revision to the target software revision.

10. A system for use in managing software upgrades in storage systems, the system comprising a processor configured to:
    receive an upgrade path information describing conditions relevant to upgrading a software from a set of source software revisions to a set of target software revisions, wherein a set of rules denotes storage system configuration conditions relevant to upgrading the software from a source software revision to a target software revision, and wherein the upgrade path information has a three-dimensional hierarchy such that each rule of the set of rules is described by a key-value pair, wherein the key denotes a condition of one or more of the storage systems and the value denotes whether the condition should be enabled or disabled;
    periodically gather storage system configuration information from a set of storage systems of a set of customers;
    analyze storage system configuration of a storage system for a software upgrade of the storage system in accordance with a set of rules associated with the software upgrade for determining whether the software upgrade can be performed for the storage system;
    based on the analysis, provide upgrade recommendations to a user of the storage system, wherein the upgrade recommendations include a set of corrective actions upon determining that the storage system configuration of the storage system are not in accordance with the set of rules associated with the software upgrade; and
    perform the software upgrade for the storage system based on the update recommendations.

11. The system of claim 10, further comprising:
    perform the set of corrective actions.

12. The system of claim 10, further comprising:
    upgrade the software of the storage system based on performing of the set of corrective actions.

13. The system of claim 10, further comprising:
    generate a report in accordance with said analyzing; and
    send the report to a customer of the storage system.

14. The system of claim 10, wherein each rule of the set of rules is associated with a set of corrective actions.

15. The system of claim 10, wherein the upgrade path information is organized in a structured format in an upgrade path database for a set of upgrade paths, each upgrade path associated with a set of rules including one or more rule criteria denoting storage system configuration conditions relevant to performing an upgrade of software for respective upgrade path.

16. The system of claim 10, wherein each rule of the set of rules identify any of a storage system configuration option, storage system configuration setting, a storage system service, or a current state of a storage system.

17. The system of claim 10, wherein the storage system configuration information is gathered repeatedly from the set of storage systems of the set of customers by a background process.

18. The system of claim 10, further comprising:
   receive a request to upgrade the software of a storage system from the source software revision to the target software revision.

* * * * *